United States Patent
Endou et al.

(10) Patent No.: US 7,039,493 B2
(45) Date of Patent: May 2, 2006

(54) NUMERICAL CONTROL APPARATUS

(75) Inventors: Katuhiro Endou, Fujiyoshida (JP); Seiji Ibuki, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 11/115,313

(22) Filed: Apr. 27, 2005

(65) Prior Publication Data

US 2005/0246053 A1 Nov. 3, 2005

(30) Foreign Application Priority Data

Apr. 28, 2004 (JP) ............................. 2004-133994

(51) Int. Cl.
*G06F 19/00* (2006.01)
(52) U.S. Cl. ...................................... 700/188; 700/186
(58) Field of Classification Search ................ 700/186, 700/188
See application file for complete search history.

(56) References Cited

U.S. PATENT DOCUMENTS 4,079,235 A * 3/1978 Froyd et al. ................ 700/169
4,879,660 A * 11/1989 Asakura et al. ............. 700/173
5,404,308 A * 4/1995 Kajiyama .................... 700/188
6,847,857 B1 * 1/2005 Sugie ......................... 700/160

FOREIGN PATENT DOCUMENTS

JP 2000-176789 6/2000

* cited by examiner

*Primary Examiner*—Leo Picard
*Assistant Examiner*—Ryan Jarrett
(74) *Attorney, Agent, or Firm*—Staas & Halsey LLP

(57) ABSTRACT

In a numerical control apparatus, a speed difference $\Delta S$ between a program command value Sc of spindle speed and a spindle rotational speed Sov to which a spindle rotational override is applied is determined. From the speed difference $\Delta S$ and a pitch command value P and a response sensitivity K of a servo system during thread cutting, a follow-up error variation $\Delta Z$ of a feed axis caused by the speed difference $\Delta S$ is calculated. The follow-up error variation $\Delta Z$ is converted into a delay time Td of a movement start of the feed axis based on the thread pitch command value P during the thread cutting. And the movement start of the feed axis is carried out behind the converted delay time Td.

1 Claim, 2 Drawing Sheets

NUMERICAL CONTROL APPARATUS

BACKGROUND OF THE INVENTION

1. Field of the Invention

The present invention relates to a numerical control apparatus having a thread cutting function and a spindle rotational speed override function.

2. Description of the Prior Art

In performing thread cutting with a lathe, cutting feeds are applied in several batches while a workpiece to be cut is being rotated by a spindle. When spindle rotational speed is changed by means of overriding during the thread cutting, a speed of a feed axis for moving a cutting tool changes, and a follow-up error in the feed axis changes. As a result, a relationship between a threaded portion and the cutting tool unavoidably changes, causing a problem that thread cutting is difficult to perform exactly.

To solve such a problem, there has been developed a method of converting a variation of a follow-up error in a feed axis, which is caused by a difference between a spindle rotation command value commanded according to a processing program and a spindle rotational speed during processing changed by means of overriding, into a spindle angle, and of shifting the spindle angle at a thread cutting start by an amount of the converted spindle angle, so as to control the thread cutting start, as disclosed in Japanese Patent Laid-Open No. 2000-176789.

The above-mentioned method determines the variation of the follow-up error in the feed axis caused by a change in the spindle rotational speed applied with overriding into the spindle angle by converting the variation into the spindle angle. A thread cutting is started from a position shifted from the spindle angle. Therefore, the precision of the thread cutting start position depends upon the resolution of a detector for detecting the spindle rotational angle, thus impairing the precision of the thread cutting.

SUMMARY OF THE INVENTION

The numerical control apparatus which has a thread cutting function and a spindle rotational speed override function, according to the present invention, comprises comparison means for determining a speed difference of a spindle rotational speed between a program command value of a spindle rotational speed commanded by a processing program and a command value of a spindle rotational speed obtained by applying a spindle rotation override to the program command value, calculation means for calculating a follow-up error variation of a feed axis caused by the speed difference, from the speed difference obtained from the comparison means, a thread pitch command value in thread cutting and response sensitivity of a servo system, conversion means for converting the calculated follow-up error variation of the feed axis into a delay time of a movement start of the feed axis by use of the thread pitch command value in thread cutting, and delay control means for delaying the movement start of the feed axis based on the delay time obtained by the conversion.

Since the numerical control apparatus which has a thread cutting function and a spindle rotational speed override function, according to the present invention, comprises the above-mentioned configuration, based on the speed difference between the program command value and the spindle rotational speed command value obtained by applying the spindle rotation override to the program command value, a delay time in the feed axis movement start for the thread cutting start is determined to start the thread cutting of the feed axis later by the determined delay time. As a result, the numerical control apparatus does not depend upon a signal from a detector such as an angle detector, therefore provides an exact thread cutting start timing without being affected by the resolution of the detector, thus improving thread cutting precision.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
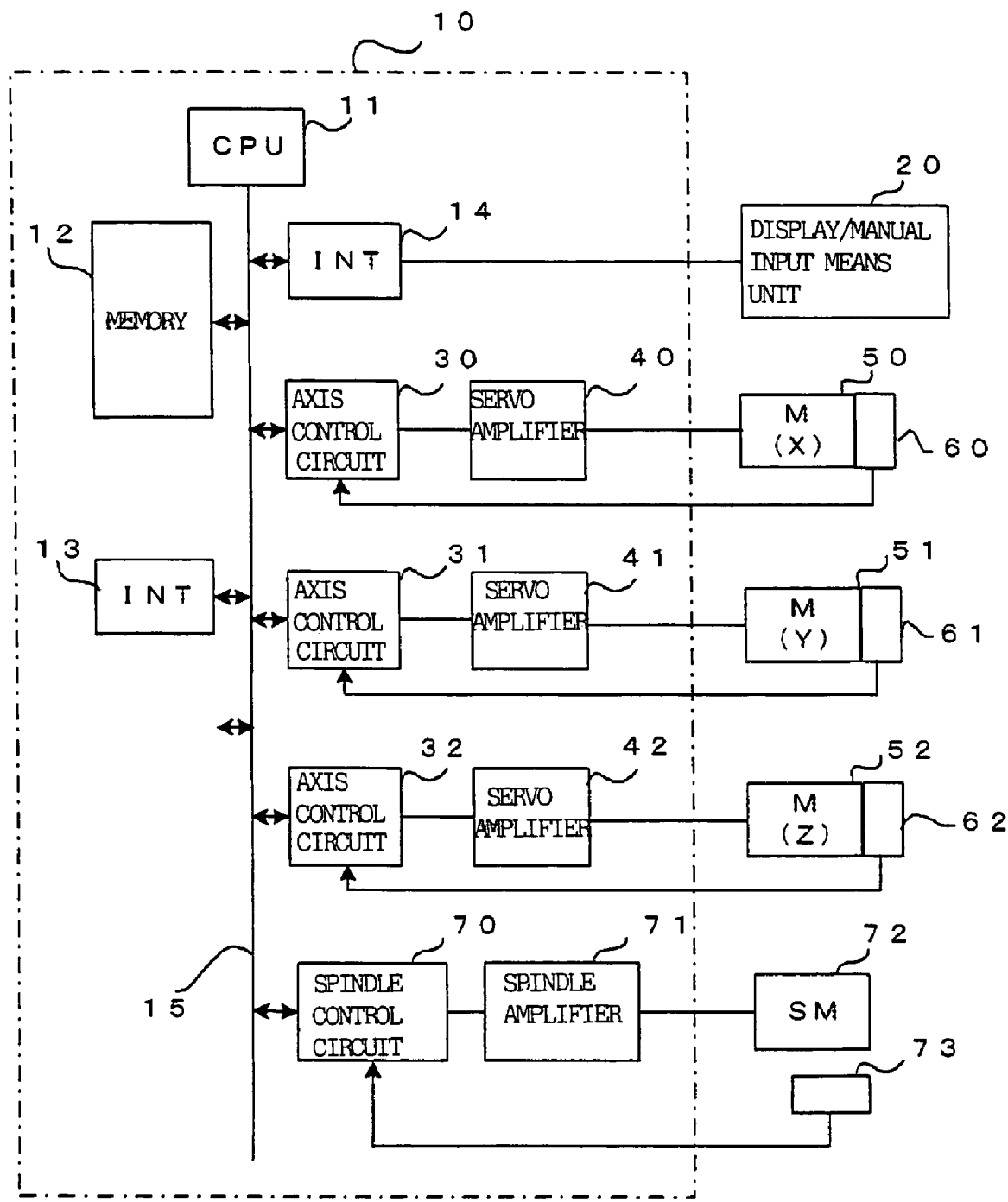
FIG. 1 is a block diagram of a substantial part of one embodiment of the numerical control apparatus of the present invention.

As shown in FIG. 1, a numerical control apparatus 10 comprises a CPU 11, and a memory 12, interfaces 13, 14, axis control circuits 30 to 32 of respective feed axes and a spindle control circuit 70, respectively connected to the CPU 11 through a bus 15.

The CPU 11 reads out a system program stored in the memory 12 through the bus 15 and controls the whole numerical control apparatus according to the system program. The memory 12 includes ROM and RAM and stores various types of data inputted by an operator through a display/manual input means unit 20 comprising a display constituted of a CRT or a liquid crystal and a keyboard, as well as a processing program loaded through the interface 13 and a processing program inputted through the display/manual input means unit 20.

The display/manual input means unit 20 includes a spindle override command switch. With an override commanded from the spindle override command switch, an override is applied to the spindle rotational speed commanded by the processing program for outputting.

The axis control circuits 30 to 32 of the respective feed axes (X-, Y- and Z-axis) receive movement command amounts of the feed axes from the CPU 11 and output commands of the respective axes to servo amplifiers 40 to 42. The servo amplifiers 40 to 42 receive the commands to drive servo motors 50 to 52 of the respective axes of a machine (or an object to be controlled). The servo motors 50 to 52 of the respective axes include position/speed detectors 60 to 62 therein and feed back position and speed feedback signals from the position/speed detector to the axis control circuits 30 to 32 for position and speed feedback control.

A spindle control circuit 70 receives a spindle rotation command and outputs a spindle speed signal to the spindle amplifier 71. The spindle amplifier 71 receives the spindle speed signal and rotates a spindle motor 72 at a commanded rotational speed. A position coder 73 feeds back a feedback pulse to the spindle control circuit 70 in synchronization with the rotation of the spindle motor 72. Thus, speed control is performed.

The above-mentioned numerical control apparatus is different from conventional ones in that, in performing thread cutting by applying cutting feed to a workpiece in a plurality of times, thread cutting is started with cutting start timing controlled, when an override is applied to the spindle rotational speed.

A spindle rotational speed (number of revolutions) command according to a processing program is denoted as Sc. A spindle rotational speed (number of revolutions) at the start of thread cutting, in case where an override is applied to the spindle rotational speed command Sc subsequent to several times of thread cuttings, is denoted as Sov. A thread pitch commanded by a processing program, a movement speed of the feed axis after a spindle override is applied, and response sensitivity of a servo system of the feed axis are taken as P, V and K, respectively. The feed axis of a cutting tool for performing a thread cutting is taken as Z-axis.

A speed difference ΔS (difference of number of revolutions) between the spindle rotational speeds before and after an override is applied is expressed by the following expression (1):

$$\Delta S = Sc - Sov \qquad (1)$$

A follow-up error variation ΔZ of the feed axis corresponding to the speed difference ΔS in the spindle rotational speed is expressed by the following expression (2):

$$\Delta Z = \Delta S * P/K \qquad (2)$$

Since a thread cutting start position appears each time a spindle makes one turn when the follow-up error variation ΔZ of the feed axis is converted into time, thread cutting start time of the feed axis should be delayed by a delay time Td determined by the following expression (3) from a thread cutting start timing prior to applying an override (or from the time elapsed after the position coder for detecting spindle speed detects a one-turn signal).

$$Td = (nP - \Delta Z)/V \qquad (3)$$

Where, n is an integer satisfying n≧ΔZ/P in the above (3) expression.

Figure 2:
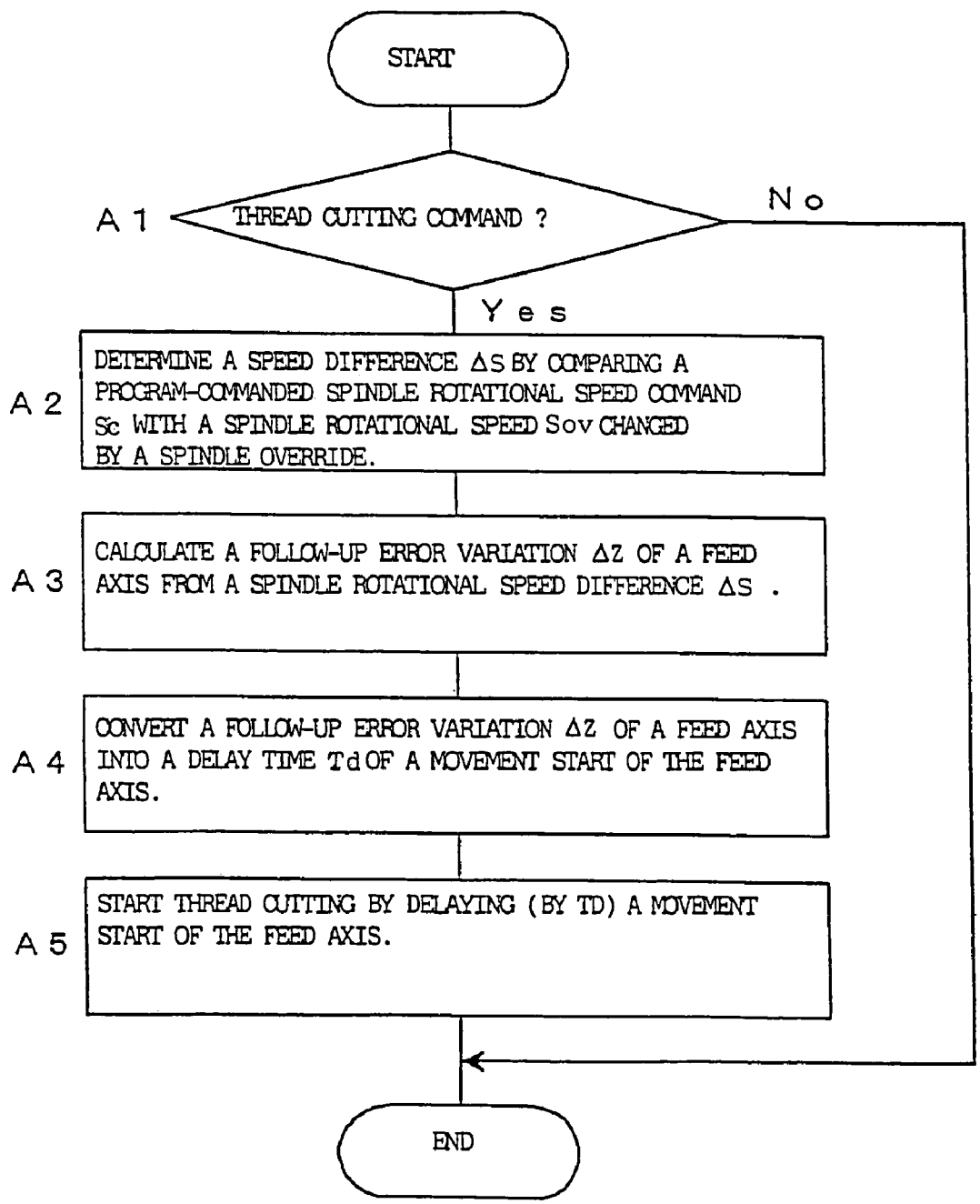
FIG. 2 is a flow chart of feed axis movement start control processing for a thread cutting using the numerical control apparatus shown in FIG. 1.

FIG. 2 is a flow sheet of thread cutting processing of the CPU 11 of the numerical control apparatus 10, focusing on explanation of thread cutting operations.

CPU 11 determines whether or not a command loaded from the processing program is a thread cutting command (step A1) and if not, program is finished without performing feed axis movement start control processing of the thread cutting. Processing for the loaded command is performed, however, this is omitted because it has no relation with the present invention.

The CPU 11, upon loading a thread cutting command, compares the spindle rotational speed command Sc which is commanded by the processing program with the spindle rotational speed Sov which is changed according to a present override command, and determine the difference ΔS. That is, processing in the above expression (1) is performed (step A2). In this embodiment, the step A2 constitutes a comparison means for determining a speed difference.

By performing calculation from the spindle rotational speed difference ΔS using the above expression (2), the follow-up error variation ΔZ of the Z-axis as the feed axis is determined (step A3). In this embodiment, the step A3 constitutes the calculation means for calculating the follow-up error variation.

By performing calculation from the determined follow-up error variation ΔZ using the above expression (3), a delay time Td of feed axis (Z-axis) movement start for thread cutting is obtained (step A4). In this embodiment, the step A4 constitutes the calculation means for converting the follow-up error variation ΔZ into delay time of movement start of the feed axis. For a value of "n" in the above (3) expression, a sufficient value satisfying "n≧ΔZ/P" should be set.

The movement of the feed axis (Z-axis) for thread cutting is started behind the start time prior to application of override, by the determined delay time Td (step A5). In this embodiment, the step A5 constitutes a delay control means for delaying the movement start of the feed axis. For example, if, before applying an override, the movement of the feed axis (Z-axis) for thread cutting is started behind a time t1 following the detection of one-turn signal feed-back from the position coder 73, the movement of the feed axis (Z-axis) in the following cycle will be started behind a time (t1+Td) following the detection of one-turn signal.

As mentioned above, in this embodiment, the movement start of the feed axis for thread cutting is delayed by the time corresponding to the follow-up error variation of the feed axis, which is not dependent upon the output of a detector. Therefore, the movement start for thread cutting can be performed in an exact timing without being affected by the resolution of the detector, thus providing highly precise thread cutting.

The invention claimed is:

1. A numerical control apparatus, having a thread cutting function and a spindle rotational speed override function, comprising:

comparison means for determining a speed difference of a spindle rotational speed between a program command value of a spindle rotational speed commanded by a processing program and a command value of a spindle rotational speed obtained by applying a spindle rotation override to the program command value;

calculation means for calculating a follow-up error variation of a feed axis caused by said speed difference, from the speed difference obtained from said comparison means, a thread pitch command value in thread cutting and response sensitivity of a servo system;

conversion means for converting the calculated follow-up error variation of the feed axis into a delay time of a movement start of the feed axis by use of the thread pitch command value in thread cutting; and delay control means for delaying the movement start of the feed axis based on the delay time obtained by the conversion.

* * * * *